United States Patent Office 3,232,966
Patented Feb. 1, 1966

3,232,966
6-FLUORO-6-DEHYDROPREGNAN COMPOUNDS
Howard J. Ringold, Albert Bowers, Octavio Mancera, and George Rosenkranz, Mexico City, Mexico, assignors, by mesne assignments, to Syntex Corporation, a corporation of Panama
No Drawing. Filed Aug. 14, 1958, Ser. No. 754,923
Claims priority, application Mexico, Aug. 16, 1957, 48,571
28 Claims. (Cl. 260—397.45)

The present invention relates to cyclopentanophenanthrene derivatives and to a process for the production thereof.

More particularly the present invention relates to novel 6-fluoro-$\Delta^{1,4,6}$-pregnatrien-17$\alpha$,21-diol-3,11,20-trione derivatives and 6-fluoro-$\Delta^{1,4,6}$-pregnatrien-11$\beta$,17$\alpha$,21-triol-3,20-dione derivatives (including those derivatives having a 9$\alpha$-chloro or 9$\alpha$-fluoro group) as well as to the corresponding $\Delta^{4,6}$-compounds constituting novel intermediates for the production of the aforementioned triene derivatives. The present invention also relates to 21-monoesters of the aforementioned compounds of hydrocarbon carboxylic acids of less than 12 carbon atoms.

In our U.S. patent application Serial No. 740,550, now U.S. Patent No. 2,934,546 filed June 9, 1958, and Serial No. 749,652, now U.S. Patent No. 2,951,840 filed July 21, 1958, there is disclosed the potent cortical hormones 6$\alpha$-fluoro-$\Delta^4$-pregnen-17$\alpha$,21-diol-3,11,20-trione and 6$\alpha$-fluoro-$\Delta^4$-pregnen-11$\beta$,17$\alpha$,21-triol-3,20-dione as well as derivatives of these compounds having a 9$\alpha$-fluoro group and their esters.

In accordance with the present invention it has been discovered that the aforementioned compounds and desirably the 21-esters thereof are intermediates for the production of the corresponding $\Delta^{4,6}$ and $\Delta^{1,4,6}$ compounds of the present invention by dehydration thereof to provide an additional double bond in the C–4(6) or both the C–1(2) and C–6(7) positions. The resultant compounds having the $\Delta^{4,6}$-structure are intermediates for the production of the corresponding $\Delta^{1,4,6}$-compounds and these last compounds are valuable hormones of the cortical type having an anti-inflammatory activity higher than the corresponding $\Delta^4$-compounds as well as lesser side reactions such as sodium retention.

The novel potent cortical compounds of the present invention having in their molecule a 6-fluorine may be characterized by the following formulas:

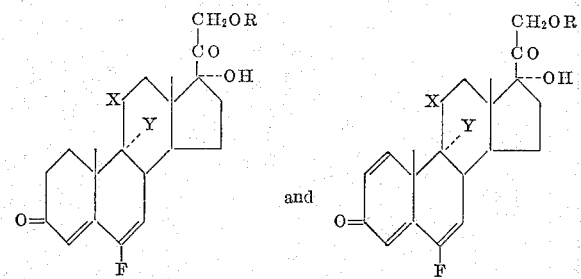

and

In the above formulas X represents =O or

Y represents hydrogen, chlorine or fluorine. R represents hydrogen or a hydrocarbon carboxylic acid acyl group of less than 12 carbon atoms. These ester groups as known in the steroid art may be saturated or unsaturated, straight or branched chain aliphatic, cyclic or cyclicaliphatic and may be conventionally substituted as by methoxy or halogen. Typical acyl groups are acetate, propionate, butyrate, hemisuccinate, caproate, benzoate, trimethylacetate, cyclopentylpropionate, phenoxypropionate and $\beta$-chloropropionate. All of the above compounds are cortical type hormones having a high anti-inflammatory activity together with a minimum of undesirable side effects.

The novel compounds of the present invention are prepared by a process outlined in the following equation:

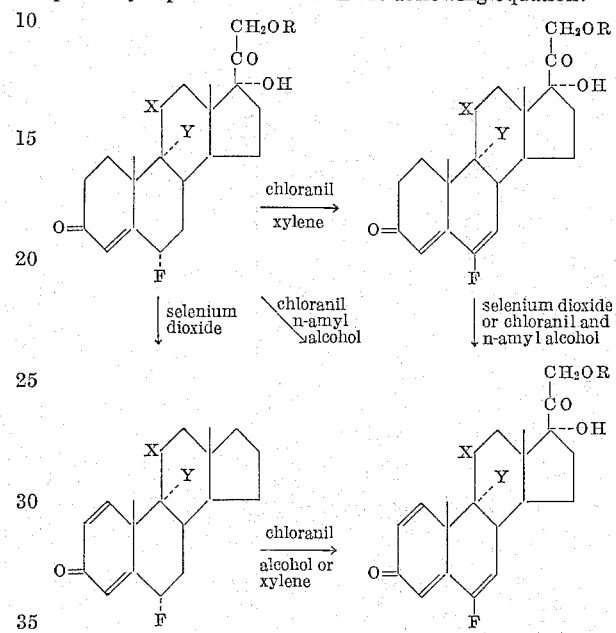

In the above equation X, Y and R represent the same groups as heretofore set forth.

The preferred starting material is one where R represents the acetate radical as for example the 21-monoacetate of the starting materials indicated. Refluxing with selenium dioxide preferably in admixture with t-butanol in the presence of pyridine gave the corresponding diene compounds, and refluxing these dienes with chloranil in n-amyl alcohol or xylene gave the corresponding acetates of $\Delta^{1,4,6}$-trienes. These last compounds were also obtained directly from the $\Delta^4$ starting materials by refluxing with chloranil in n-amyl alcohol. Refluxing the $\Delta^4$ starting compounds with chloranil in xylene however, produced the $\Delta^{4,6}$-derivatives indicated which could be transformed to the $\Delta^{1,4,6}$-derivatives by a second treatment with chloranil in n-amyl alcohol or by refluxing with selenium dioxide. As may be understood, other esters of the type previously set forth may be used instead of the acetates and the $\Delta^{4,6}$, $\Delta^{1,4}$ and $\Delta^{1,4,6}$ ester compounds prepared may be conventionally saponified and reesterified.

The following specific examples serve to illustrate but are not intended to limit the present invention.

*Example I*

A mixture of 1.5 g. of the 21-acetate of 6$\alpha$-fluoro-cortisone, 2 g. of chloranil and 30 cc. of anhydrous n-amyl alcohol was refluxed for 16 hours, cooled and diluted with ether; the solution was washed with water, 5% sodium carbonate solution and water, dried over anhydrous sodium sulfate, filtered and evaporated to dryness. Chromatography of the residue on ethyl acetate washed alumina yielded the 21-acetate of 6-fluoro-$\Delta^{1,4,6}$-pregnatrien-17$\alpha$,21-diol-3,11,20-trione.

*Example II*

1 g. of the 21-acetate of 6$\alpha$-fluoro-9$\alpha$-chloro-$\Delta^4$-pregnen-11$\beta$,17$\alpha$,21-triol-3,20-dione was mixed with 1.6 g. of chloranil and 40 cc. of xylene and refluxed for 12 hours. The cooled mixture was diluted with ether, washed with water, 5% sodium carbonate solution and water to neutral, dried over anhydrous sodium sulfate and evaporated to dryness under reduced pressure. Chromatography of the residue on ethyl acetate washed alumina furnished the 21-acetate of 6-fluoro-9α,chloro-Δ$^{4,6}$-pregnadien-11β,17α,21-triol-3,20-dione.

A mixture of 1 g. of the 21-acetate of 6-fluoro-9α-chloro-Δ$^{4,6}$-pregnadien-11β,17α,21-triol-3,20-dione, 50 cc. of anhydrous t-butanol, 300 mg. of selenium dioxide and 0.2 cc. of pyridine was refluxed for 70 hours under an atmosphere of nitrogen, diluted with ethyl acetate and filtered through celite, washing the filter with hot ethyl acetate. The combined filtrate and washings was evaporated to dryness under reduced pressure and the residue was triturated with water and collected by filtration, dried and chromatographed on neutral alumina. There was thus obtained the 21-acetate of 6-fluoro-9α-chloro-Δ$^{1,4,6}$-pregnatrien-11β,17α,21-triol-3,20-dione.

*Example III*

A mixture of 1 g. of the 21-acetate of 6α,9α-difluoro-Δ$^{1,4}$-pregnadien-17α,21-diol-3,11,20-trione, 1.5 g. of chloranil and 20 cc. of n-amyl alcohol was refluxed for 12 hours and the reaction product was then worked up as described in Example I, thus giving the 21-acetate of 6,9α-difluoro - Δ$^{1,4,6}$ - pregnatrien - 17α,21-diol-3,11,20-trione. In another experiment, the n-amyl alcohol was substituted by xylene, with the same result.

*Example IV*

1 g. of the 21-acetate of 6-fluoro-Δ$^{1,4,6}$-pregnatrien-17α,21-diol-3,11,20-trione, obtained in accordance with the method of Example I, was mixed with 20 cc. of anhydrous methanol, cooled to 0° C. and slowly treated with stirring with a cooled solution of sodium methoxide prepared by dissolving 70 mg. of sodium in 5 cc. of anhydrous methanol; the stirring was continued for half an hour under an atmosphere of nitrogen and then the mixture was acidified with a few drops of acetic acid and poured into ice water. The precipitate was collected, dried and recrystallized from acetone-hexane, thus affording the free 6-fluoro-Δ$^{1,4,6}$-pregnatrien-17α21-diol-3,11,20-trione.

By the same method from the 21-acetates of 6-fluoro-9α-chloro-Δ$^{4,6}$-pregnadien-11β,17α,21-triol-3,20-dione and 6 - fluoro - 9α - chloro-Δ$^{1,4,6}$-pregnatrien-11β,17α,21-triol-3,20-dione of Example II there were obtained the corresponding free compounds. Similarly the 21-acetate group of 6,9α - difluoro - Δ$^{1,4,6}$-pregnatrien-17α,21-diol-3,11,20-trione of Example III was converted to a free hydroxyl.

*Example V*

A mixture of 1 g. of 6-fluoro-Δ$^{1,4,6}$-pregnatrien-17α,21-diol-3,11,20-trione, obtained in accordance with the previous example, 20 cc. of pyridine and 1 cc. of propionic anhydride was kept overnight at room temperature and then poured into water. The reaction product was extracted with ethyl acetate, washed with water, dilute hydrochloric acid, water, 5% sodium carbonate solution and finally again with water, dried over anhydrous sodium sulfate and evaporated to dryness. Crystallization of the residue from acetone-hexane yielded the 21-propionate of 6-fluoro-Δ$^{1,4,6}$-pregnatrien-17α,21-diol-3,11,20-trione.

By the same method all of the other free alcohols of Example IV were converted to the corresponding 21-monopropionates. Using other corresponding acid anhydrides or chlorides by the same conventional esterification there were also prepared the corresponding benzoates, cyclopentylpropionates as well as other hydrocarbon carboxylic esters of less than 12 carbon atoms.

We claim:
1. Compounds of the following formula:

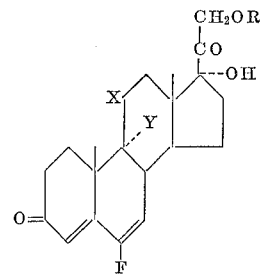

wherein X is selected from the group consisting of =O and

Y is selected from the group consisting of hydrogen, chlorine and fluorine and R is selected from the group consisting of hydrogen and a hydrocarbon carboxylic acyl group of up to 12 carbon atoms.

2. 6-fluoro-Δ$^{4,6}$-pregnadien-17α,21-diol-3,11,20-trione.

3. The 21-mono hydrocarbon carboxylic acid esters of up to 12 carbon atoms of 6-fluoro-Δ$^{4,6}$-pregnadien-17α,21-diol-3,11,20-trione.

4. 6,9α - difluoro - Δ$^{4,6}$ - pregnadien - 17α,21 - diol-3,11,20-trione.

5. The 21-mono hydrocarbon carboxylic acid esters of up to 12 carbon atoms of 6,9α-difluoro-Δ$^{4,6}$-pregnadien-17α,21-diol-3,11,20-trione.

6. 6 - fluoro - 9α - chloro - Δ$^{4,6}$ - pregnadien - 17α,21-diol-3,11,20-trione.

7. The 21-mono hydrocarbon carboxylic acid esters of up to 12 carbon atoms of 6-fluoro-9α-chloro-Δ$^{4,6}$-pregnadien-17α,21-diol-3,11,20-trione.

8. 6 - fluoro - Δ$^{4,6}$ - pregnadien - 11β,17α,21 - triol-3,20-dione.

9. The 21-mono hydrocarbon carboxylic acid esters of up to 12 carbon atoms of 6 - fluoro - Δ$^{4,6}$ - pregnadien-11β,17α,21-triol-3,20-dione.

10. 6,9α - difluoro - Δ$^{4,6}$ - pregnadien - 11β,17α,21-triol-3,20-dione.

11. The 21-mono hydrocarbon carboxylic acid esters of up to 12 carbon atoms of 6,9α-difluoro-Δ$^{4,6}$-pregnadien-11β,17α,21-triol-3,20-dione.

12. 6 - fluoro - 9α - chloro-Δ$^{4,6}$-pregnadien-11β,17α,21-triol-3,20-dione.

13. The 21-mono hydrocarbon carboxylic acid esters of up to 12 carbon atoms of 6-fluoro-9α-chloro-Δ$^{4,6}$-pregnadien-11β,17α,21-triol-3,20-dione.

14. Compounds of the following formula:

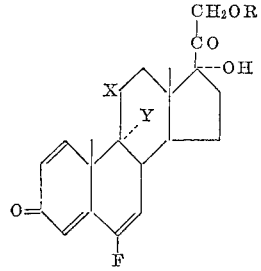

wherein X is selected from the group consisting of =O and

Y is selected from the group consisting of hydrogen, chlorine and fluorine and R is selected from the group consisting of hydrogen and a hydrocarbon carboxylic acyl group of up to 12 carbon atoms.

15. 6 - fluoro - $\Delta^{1,4,6}$ - pregnatrien - 17α,21-diol-3,11,20-trione.

16. The 21-mono hydrocarbon carboxylic acid esters of up to 12 carbon atoms of 6-fluoro-$\Delta^{1,4,6}$-pregnatrien-17α,21-diol-3,11,20-trione.

17. 6,9α - difluoro - $\Delta^{1,4,6}$ - pregnatrien - 17α,21 - diol-3,11,20-trione.

18. The 21-mono hydrocarbon carboxylic acid esters of up to 12 carbon atoms of 6,9α-difluoro-$\Delta^{1,4,6}$-pregnatrien-17α,21-diol-3,11,20-trione.

19. 6 - fluoro - 9α - chloro - $\Delta^{1,4,6}$ - pregnatrien - 17α,21-diol-3,11,20-trione.

20. The 21-mono hydrocarbon carboxylic acid esters of up to 12 carbon atoms of 6-fluoro-9α-chloro-$\Delta^{1,4,6}$-pregnatriene-17α,21-diol-3,11,20-trione.

21. 6 - fluoro - $\Delta^{1,4,6}$ - pregnatrien - 11β,17α,21 - triol-3,20-dione.

22. The 21-mono hydrocarbon carboxylic acid esters of up to 12 carbon atoms of 6-fluoro-$\Delta^{1,4,6}$-pregnatrien-11β,17α,21-triol-3,20-dione.

23. 6,9α - difluoro - $\Delta^{1,4,6}$ - pregnatrien - 11β,17α,21-triol-3,20-dione.

24. The 21-mono hydrocarbon carboxylic acid esters of up to 12 carbon atoms of 6,9α-difluoro-$\Delta^{1,4,6}$-pregnatrien-11β,17α,21-triol-3,20-dione.

25. 6 - fluoro - 9α-chloro-$\Delta^{1,4,6}$-pregnatrien-11β,17α,21-triol-3,20-dione.

26. The 21-mono hydrocarbon carboxylic acid esters of up to 12 carbon atoms of 6-fluoro-9α-chloro-$\Delta^{1,4,6}$-pregnatrien-11β,17α,21-triol-3,20-dione.

27. A compound of the formula:

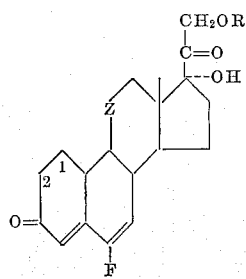

wherein the 1,2 carbon atom linkage is selected from the group consisting of single bond and doubled bond linkages, wherein Z is selected from the group consisting of the carbonyl radical (>C=O) and the β-hydroxy methylene radical

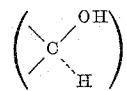

and R is selected from the group consisting of hydrogen and hydrocarbon acyl group of up to 4 carbon atoms.

28. A compound of the formula:

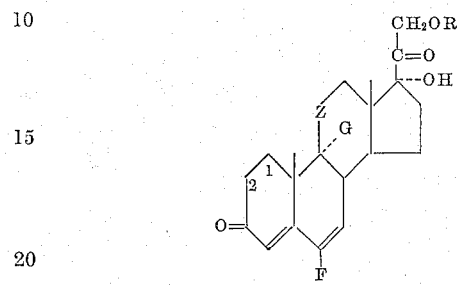

wherein the 1,2 carbon atom linkage is selected from the group consisting of single bond and double bond linkages, G is selected from the group consisting of hydrogen and fluorine, Z is selected from the group consisting of the carbonyl radical (>C=O) and the

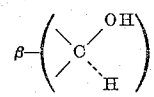

and R is selected from the group consisting of hydrogen and a hydrocarbon acyl group of up to 12 carbon atoms.

References Cited by the Examiner

UNITED STATES PATENTS

| | | | |
|---|---|---|---|
| 2,838,548 | 6/1958 | Magerlein et al. | 260—397.45 |
| 2,841,600 | 7/1958 | Hogg et al. | 260—397.45 |
| 2,877,239 | 3/1959 | Agnello et al. | 260—397.4 |
| 2,881,168 | 4/1959 | Spero | 260—239.55 |
| 2,882,282 | 4/1959 | Agnello et al. | 260—397.3 |

OTHER REFERENCES

New Paths to New Steroids, Chem. & Eng. News; Sept. 16, 1957, pp. 66 and 67.

LEWIS GOTTS, *Primary Examiner.*

LESLIE H. GASTON, MORRIS LIEBMAN, *Examiners.*

UNITED STATES PATENT OFFICE
CERTIFICATE OF CORRECTION

Patent No. 3,232,966  February 1, 1966

Howard J. Ringold et al.

It is hereby certified that error appears in the above numbered patent requiring correction and that the said Letters Patent should read as corrected below.

Column 2, lines 25 to 35, the left-hand formula should appear as shown below instead of as in the patent:

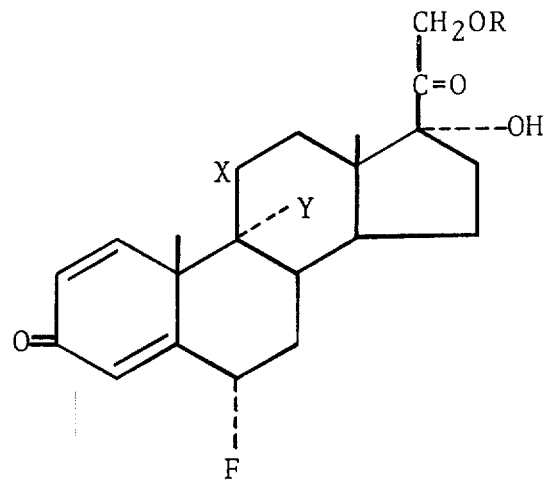

Signed and sealed this 6th day of December 1966.

(SEAL)
Attest:

ERNEST W. SWIDER  
Attesting Officer

EDWARD J. BRENNER  
Commissioner of Patents